(12) United States Patent
McRae

(10) Patent No.: US 8,988,013 B2
(45) Date of Patent: Mar. 24, 2015

(54) METHOD AND APPARATUS FOR PROVIDING POWER TO LIGHT STRINGS

(71) Applicant: Michael M. McRae, Ormond Beach, FL (US)

(72) Inventor: Michael M. McRae, Ormond Beach, FL (US)

(73) Assignee: National Christmas Products, Cranford, NJ (US)

( * ) Notice: Subject to any disclaimer, the term of this patent is extended or adjusted under 35 U.S.C. 154(b) by 126 days.

(21) Appl. No.: 13/986,063

(22) Filed: Mar. 28, 2013

(65) Prior Publication Data

US 2014/0077726 A1    Mar. 20, 2014

Related U.S. Application Data

(60) Provisional application No. 61/685,965, filed on Mar. 28, 2012.

(51) Int. Cl.
*H05B 37/02* (2006.01)
*H05B 33/08* (2006.01)

(52) U.S. Cl.
CPC .............. *H05B 37/02* (2013.01); *H05B 33/089* (2013.01); *H05B 33/0815* (2013.01)
USPC ................... 315/313; 315/185 R; 315/185 S; 315/192; 315/291; 315/294; 315/297

(58) Field of Classification Search
CPC ............................ H05B 37/02; H05B 33/0815
USPC .......... 315/185 R, 185 S, 192, 291, 294, 297, 315/313
See application file for complete search history.

(56) References Cited

U.S. PATENT DOCUMENTS

| | | | | |
|---|---|---|---|---|
| 4,215,277 | A * | 7/1980 | Weiner et al. ................... 307/41 |
| 2004/0066148 | A1* | 4/2004 | Oskorep et al. ............ 315/185 S |
| 2010/0141161 | A1* | 6/2010 | Hering et al. .............. 315/185 S |
| 2011/0089844 | A1* | 4/2011 | Grajcar .......................... 315/193 |
| 2011/0241551 | A1* | 10/2011 | McRae .......................... 315/130 |

\* cited by examiner

*Primary Examiner* — Douglas W Owens
*Assistant Examiner* — Pedro C Fernandez
(74) *Attorney, Agent, or Firm* — Brian K. Johnson Esq., LLC

(57) ABSTRACT

A light string power module is provided for providing power to light strings while replicating a lighting pattern from a first light string in providing said power. The illumination pattern of the first light string, which is not powered by the light string power module, is detected by examining the voltage polarities presented on the leads of a first connector to which the first light string is attached. These detected polarities are replicated by a switching module at matching leads on a second connector to which a second light string is attached. A power processing module accepts input power and provides output DC power to the switching module such that the second light string is powered by said output DC power in concert with the replicated voltage polarities so as to replicate the light pattern presented by the first light string on the second light string.

12 Claims, 9 Drawing Sheets

METHOD AND APPARATUS FOR PROVIDING POWER TO LIGHT STRINGS

CROSS REFERENCE TO RELATED APPLICATIONS

This application claims priority to and the benefit of U.S. Provisional Patent Application No. 61/685,965 filed Mar. 28, 2012 titled "Method and Apparatus for Providing Power to Light Strings" which is incorporated by reference herein in its entirety.

STATEMENT REGARDING FEDERALLY SPONSORED RESEARCH OR DEVELOPMENT

Not applicable.

BACKGROUND OF THE DISCLOSURE

1. Field of the Invention

The invention is directed to a system and method for providing a power boosting function to a light string. A first light string is used to provide color signaling to a second light string which follows the lighting pattern of the first light string. The power booster provides a connection to the first light string to receive the color signaling information but does not provide power to the first light string. The power booster contains electric circuitry and/or software to allow the input color signaling to be replicated on the second light string while also providing power to the second light string. The power booster may support multiple light strings connections so that a plurality of light strings maybe powered through the booster which simultaneously provides the input color signaling from the first light string to all of or a portion of the powered light strings.

2. Description of the Prior Art

Low voltage, low power LED light strings are becoming increasingly popular in holiday decorations. These light strings are powered by a power module that has two critical limitations: 1) the maximum power capable of being supplied by the module, and 2) a finite number of connections on the module at which the light strings to be powered may be attached. With respect to the first limitation, a power module may be provided with only one connection to power a single light string. That light string, however, may be connected in series with additional light strings. At some point, after a certain number of series-connected light strings have been coupled, the powering capability of the one power port or the entire power module itself will be exceeded. At this point additional power modules have to be added in order to expand the lighting system. With respect to the second limitation, there are simply a finite number of light string power outputs connections that can be provided on any one power module regardless of that module's total power output capacity. Thus, due to both limitations, a need exists for extending the powering capability of light string systems.

The need for expandable powering introduces an additional consideration when synchronized lighting is desired. In a two-color LED system for example, a first light string may be lit according to a particular lighting pattern. The lighting pattern may be defined by either one or both of spatial and temporal characteristics. If the overall light string system is to be visually consistent, then the additional light strings would desirously have the same lighting pattern. This may be easily achieved by a single controller attached to a single power module. If however, additional power modules are introduced to the light string system, as a consequence of above-recited limitations for example, then synchronizing the separately powered sub-portions of the overall lighting system becomes an issue.

To date, no commercially available light string power module has been provided that mirrors a lighting pattern provided on a first light string, not powered by the power module, to one or more additional light strings powered by the power module.

SUMMARY OF THE INVENTION

In one preferred embodiment of the present invention, a light string power module coupled to a first light string and a second light string is provided and the power module includes: a power processing module for receiving input AC power and providing output DC power; a first connector used to provide a connection to the first light string, a second connector used to provide a connection to the second light string, each of the first and second connectors having a plurality of leads, each of the leads of the first connector having a matching lead in the second connector; a switching module coupled to the power processing module and the first and second connectors, the switching module having a high impedance input section for detecting a voltage polarity at the leads of the first connector, a switching section for accepting the detected voltage polarity of the leads of the first connector and providing the same voltage polarity to each of the matching leads of the second connector thereby passing the output DC power provided by the power processing module to the second light string.

In various aspects of this embodiment, the power processing module includes a high voltage to low voltage converter; the input power is AC power and the power processing module includes an AC-to-DC rectifier; the coupling between the high impedance input section and the switching section includes an optical coupler; or the optical coupler is included within a bulb harness disposed external to a housing of the light string power module, the optical coupler coupled to the leads of the first connector. In yet other variations, the optical coupler is a photo-transistor; the first and second connectors are polarized; the switching section includes discrete electronic components including resistors and silicon controlled rectifiers; or the switching module includes an integrated circuit. In still other aspects, the integrated circuit includes a microprocessor and associated memory, the microprocessor executing a program stored in the associated memory to provide the detected voltage polarity at the leads of the first connector to the matching leads in the second connector; the invention further includes a pattern control switching module for generating an independent light color pattern and a switch for selecting one of the switching module or the pattern control switching module, the voltage polarities presented to the leads of the second connector being provided by the pattern control switching module instead of the switching module when the switch is set to select the pattern control switching module; or further includes a wireless controller for controlling the pattern control switching module and the switch.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, in which.

DETAILED DESCRIPTION

Figure 1:
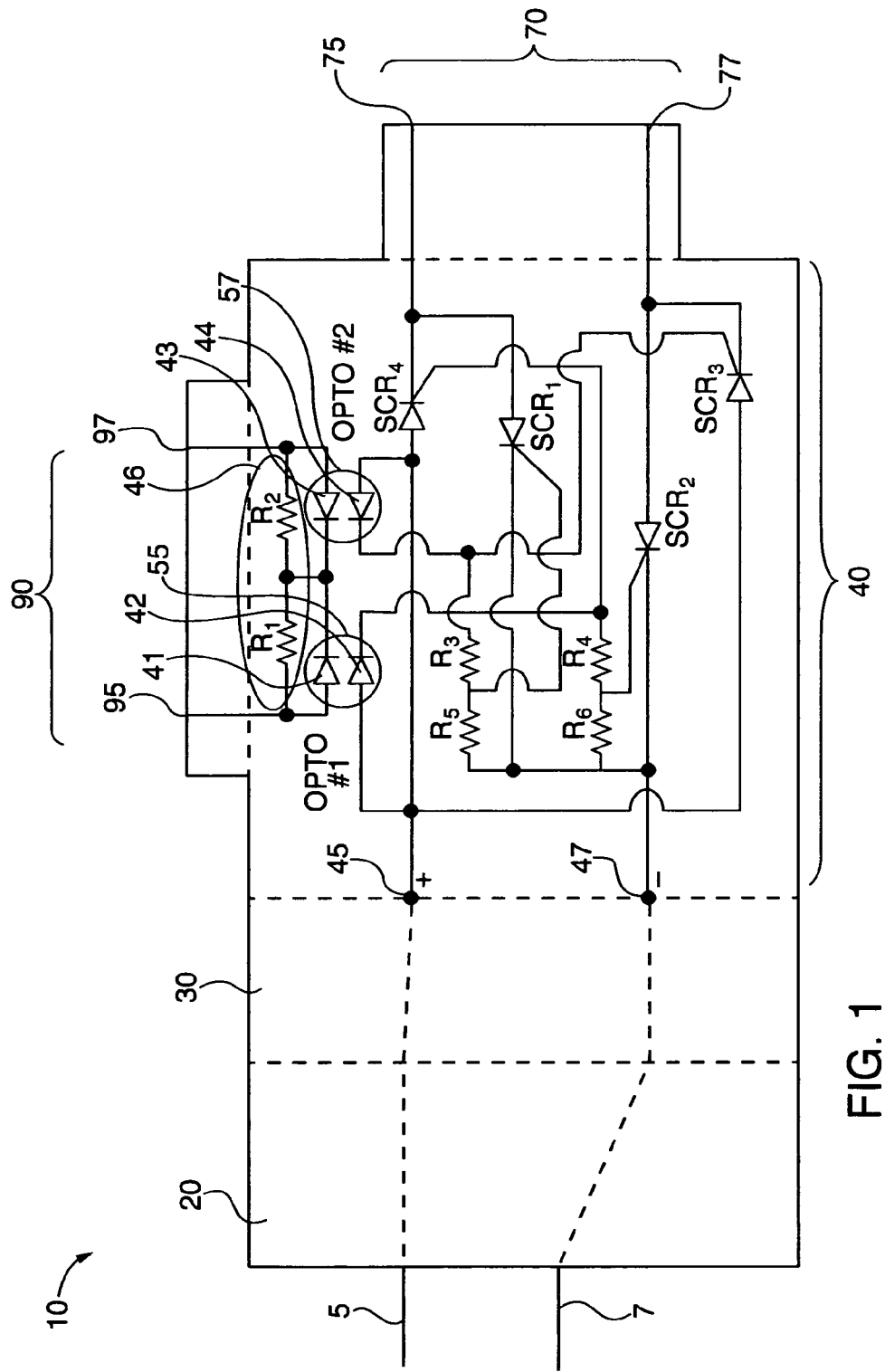
FIG. 1 shows a block and partial circuit diagram of light string power module according to one embodiment of the system and method of the present invention.

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention.

It is also to be understood that the present invention may be implemented in various forms of hardware, software, firmware, special purpose processors, or a combination thereof. Preferably, the present invention is implemented in hardware possibly containing software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or combination thereof) which is executed via the operating system. In addition, various other peripheral devices may be connected to the computer platform such as an additional data storage device and a printing device.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computers or devices may be interconnected using any existing or later-discovered networking technology and may also all be connected through a lager network system, such as a corporate network, metropolitan network or a global network, such as the internet.

Those of skill in the art will appreciate that while the description provided below specifically recites LED light strings and power modules, the general teachings of the invention are applicable to other light string systems using other types of light strings, such as incandescent bulbs, phosphorescent bulbs, luminescent bulbs, and other electric bulbs. It is understood that other light bulb types and lighting technologies may require modification so as to function properly in connection with the present invention. Further, those of skill in the art will also appreciate that in the descriptions below a particular power polarity applied across any pair of leads operates to bias one or more LEDs on the attached light strings and therefore also functions as a color control signal. This arrangement may be replaced by the equivalent structure of a switched power module operated under the control of a more sophisticated control module, either or both being constructed in hardware or software, such that the powering and control functions are separated.

FIG. 1 provides a block and partial circuit diagram of the power module of the present invention according to one preferred embodiment. Power module 10 is provided typical 120 V AC power from a residential power outlet at blades 5 and 7. Input AC power is converted from high voltage to low voltage within optional voltage conversion module 20. Low voltage power is then provided to AC-DC conversion module 30 which converts the low voltage AC power to low voltage DC power. These two modules 20 and 30 may be unitary or distinct. DC power is then provided to the switching module 40 at points 45 and 47. AC-DC conversion module 30 may be omitted if DC power is provided directly to the power module 10 at blades 5 and 7.

Switching module 40 has at least two light string connectors 70 and 90. The light string attached at connector 90 is the input light string, or first light string (not shown). The first light string provides the lighting pattern to be mimicked but does not receive power from power module 10. First light string provides its color control signals to the power module 10 at leads 95 and 97. The powered light string, or second light string (also not shown), is attached at connector 70 and receives its color and/or power signals at leads 75 and 77 respectively.

The remaining structure of the switching module will be described in connection with the operation of the circuitry that implements the switching function as presented in FIG. 1. Section 46 of switching module 40 provides a high impedance input section for the first light string coupled to connector 90. When the first light string provides a positive polarity signal at lead 95 (with reference to lead 97) the top diode 41 in optical coupler 55 is forward biased and turns on. Low voltage power from the first light string flows through that upper diode 41 and out through resistor R2 to lead 97 thereby completing the circuit at the high impedance section 46 at connector 90 into which the first light string is plugged. The forward biasing of upper diode 41, in turn provides a forward bias to lower diode 42 in optical coupler 55 which allows power provided at point 45 to flow through the lower diode 42 and on to two additional components: the gates of silicon controlled rectifiers SCR2 and SCR4. A gate bias voltage is provided directly to the gate of SCR4 thereby turning it on and providing power from point 45 to lead 75 on connector 70 and out to the second light string. A gate bias voltage is also provided to the gate of SCR2 through resistive network R4 and R6 which are properly sized to provide the proper turn-on gate voltage to SCR 2. The activation of SCR2 allows power to flow back from the second light string at lead 77 of connector 70 and on to point 47 thereby completing the circuit for the second light string. In this manner, power is provided to the second light string by power module 10 while at the same time matching the relative polarity of leads 95 and 97 at leads 75 and 77 respectively.

When the polarity of the first light string leads 95 and 97 are reversed, i.e. lead 97 is positively polarized with respect to lead 95, then complementary circuitry is employed to match the polarity at leads 77 and 75 which are simultaneously powered by power module 10. In particular, when the first light string provides a positive polarity signal at lead 97 (with reference to lead 95) the top diode 43 in optical coupler 57 is forward biased and turns on. Low voltage power from the first light string flows through that upper diode 43 and out through resistor R1 to lead 95 thereby completing the circuit at the end connection of the first light string that is plugged into connector 90. The forward biasing of upper diode 43, in turn provides a forward bias to lower diode 44 in optical coupler 57 which allows power provided at point 45 to flow through the lower diode 44 and on to two additional components: the gates of silicon controlled rectifiers SCR1 and SCR3. Turn on gate voltage is provided directly to the gate of SCR3 thereby turning it on and providing power from point 45 to lead 77 on connector 70 and out to the second light string. Activation gate voltage is also provided to the gate of SCR1 through resistive network R3 and R5 which are properly sized to provide the proper turn-on gate voltage to SCR 1. The activation of SCR1 allows power to flow back from the second light string to lead 75 at connector 70 and on to point 47 thereby completing the circuit for the second light string. In this manner, power is provided to the second light string by power module 10 while at the same time matching the relative polarity of leads 95 and 97 at leads 75 and 77 respectively.

Figure 2:
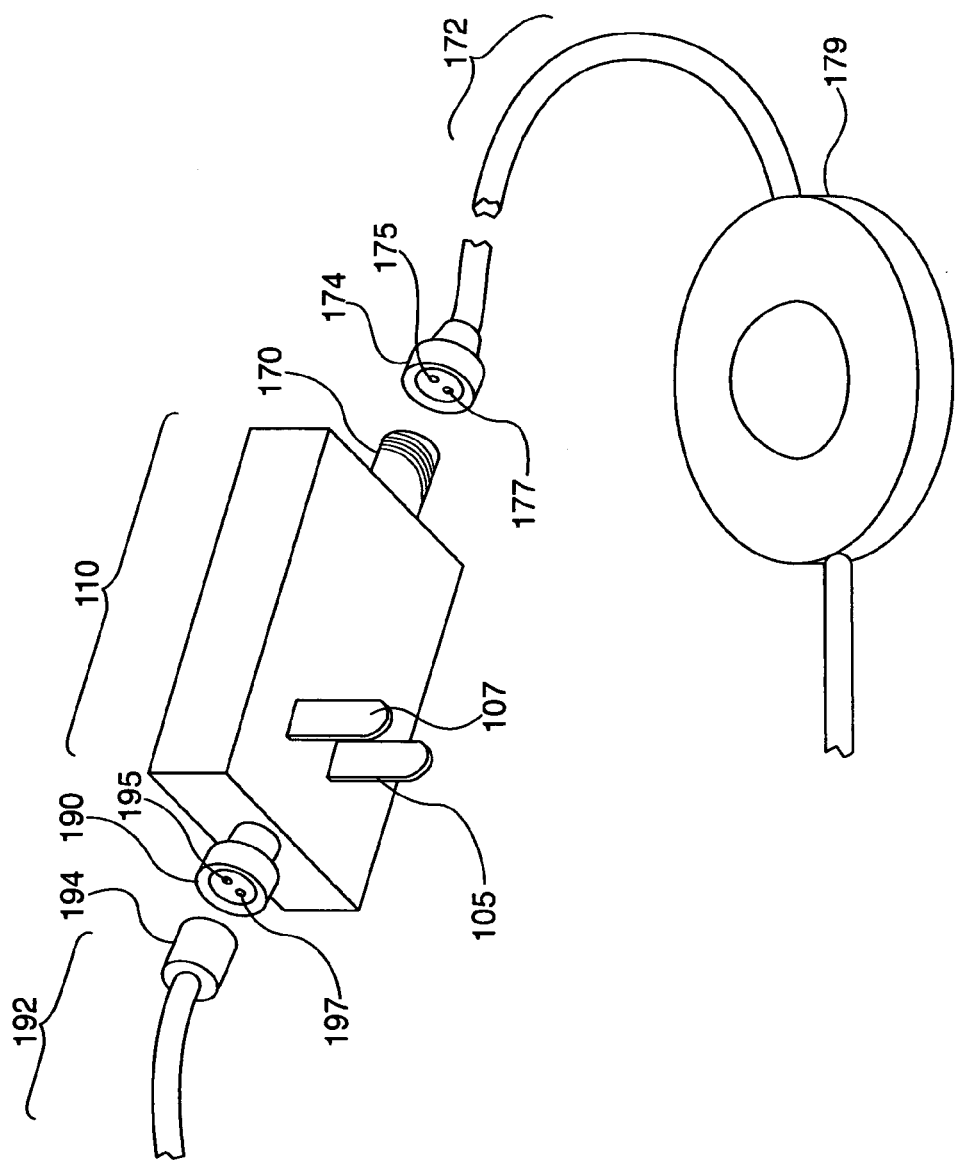
FIG. 2 shows an external view of the light string power module of FIG. 1 according to one embodiment of the present invention.

FIG. 2 shows an external view of the power module 110 including the first and second light strings (uncoupled to the power module). First light string 192 has polarized connector 194 that mateably engages with polarized connector 190 on the power module 110. The two leads 195 and 197 that make electrical connection with the first light string leads (not shown) are shown within connector 190. Blades 105 and 107 are sized according to the appropriate electrical building standards and are provided for plugging into a residential electrical outlet for supplying power to the power module 110. Second light string 172 has polarized connector 174 that mateably engages with polarized connector 170 on the power module 110. The two leads 175 and 177 within the second light string are provided and make electrical connection with the leads within connector 170 (not shown). Foot petal 179 is provided on the second light string so as to provide independent power switching capability for that light string.

Figure 3:
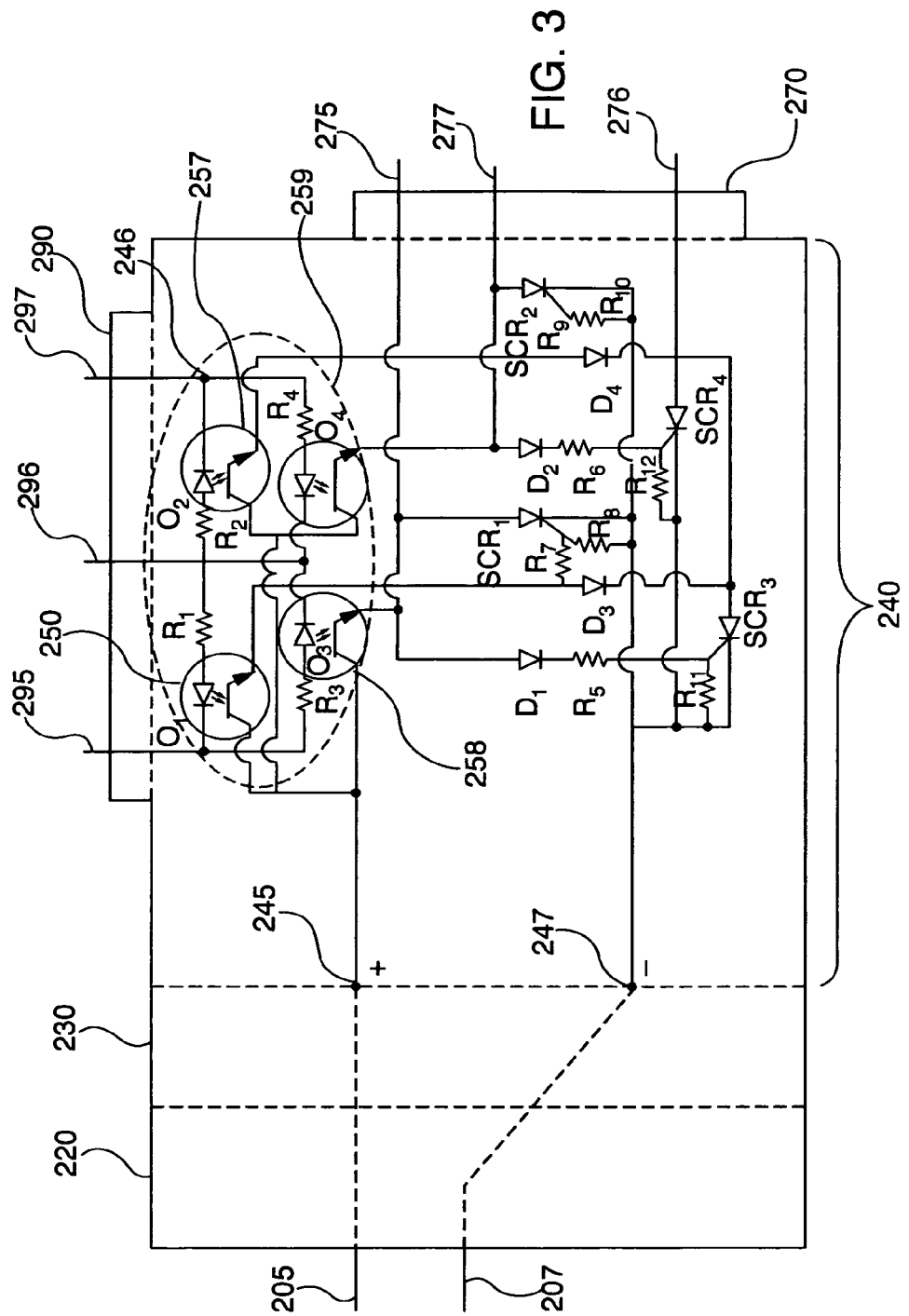
FIG. 3 shows a block and partial circuit diagram of light string power module according to another embodiment of the system and method of the present invention.

FIG. 3 provides a partial circuit diagram of the power module of the present invention according to another preferred embodiment. In this embodiment, three color control signals, 295, 296 and 297, are input at connector 290 from a first light string (not shown). With three color control signals, eight different powering patterns may be replicated with the circuitry presented within power module 210 at second light string connector 270. Power module 210 is provided typical 120 V AC power from a typical residential power outlet at blades 205 and 207. Input AC power is converted from high voltage to low voltage within optional voltage conversion module 220. Low voltage power is then provided to AC-DC conversion module 230 which converts the low voltage AC power to low voltage DC power. These two modules may be unitary or distinct. DC power is then provided to the switching module 240 at points 245 and 247.

Switching module 240 has at least two light string connectors 270 and 290. The light string attached at connector 290 is the input light string, or first light string (not shown). The first light string provides the lighting pattern to be mimicked but does not receive power from power module 210 and is connected at high impedance circuitry 246. The first light string provides its color control signals to the power module 210 at leads 295, 296 and 297. The powered light string or second light string (also not shown), is attached at connector 270 and receives its color and/or power signals at leads 275, 276 and 277 respectively.

The remaining structure of the switching module will be described in connection with the operation of the circuitry that implements the switching function as presented in FIG. 3. When the first light string provides a positive polarity signal at lead 295 (with reference to lead 296 and 297) and no polarity difference between leads 296 and 297, i.e. neither one is "driven," the diode of optical transistor 258 is forward biased and turns on. Low voltage power from the first light string flows through that upper diode 41 and out through resistor R2 to lead 97 thereby completing the circuit at the end connection of the first light string that is plugged into connector 90. The activation of optical transistor 258 in turn activates the lower transistor in that element which allows power provided at point 245 to flow through the transistor and on to lead 275 at output connector 270. The activation of optical transistor 258 also in turn results in a turn on voltage being applied at the gate of silicon controlled rectifier SCR3 through resistive network R5 & R11. Activation of SCR3 results and allows for lead 276 on connector 270 to be low. Since SCR 2 is not activated (optical transistor 259 is off) there is no driven low at lead 277 on connector 270. The activation of SCR3 allows power to flow back from lead 276 at connector 270 connected to the second light string and on to point 247, thereby completing the circuit for the second light string. In this manner, power is provided to the second light string by power module 210 while at the same time matching the relative polarity of leads 295 and 297 at leads 275 and 277.

The replication at outputs 275, 276 and 277 of other combinations of input light string color signals at leads 295, 296 and 297 respectively is provided through the operation of the circuitry of FIG. 3 according to the following table:

| Relative voltage (H or L) at connector leads 295/296/297 | Optical couplers activated | SCRs triggered | Resistive networks employed | Relative voltage (H or L) at connector leads 275/276/277 |
|---|---|---|---|---|
| LLL | NONE | NONE | NONE | LLL |
| LLH | 259 | SCR4 | R6/R12 | LLH |
| LHL | 255, 257 | SCR1 & SCR2 | R7/R8 & R9/R10 | LHL |
| LHH | 255 | SCR1 | R7/R8 | LHH |
| HLL | 258 | SCR3 | R5/R11 | HLL |
| HLH | 258, 259 | SCR3 & SCR4 | R5/R11 & R6/R12 | HLH |
| HHL | 257 | SCR2 | R9/R10 | HHL |
| HHH | NONE | NONE | NONE | HHH |

Those of skill in the art will recognize several features with respect to FIGS. 1 and 3. First, any of a variety of optical couplers (alternatively named opto-isolator, optocoupler, photocoupler, or optical isolator) may be used as the coupling mechanism between the high impedance input section and the actual switching portion of the switch module. That is, any of a variety of coupling mechanisms may be used to accept the input color signaling at input 90/290 and activate appropriate circuitry within the power modules 10 and 210. Second, as with all transistor circuitry, not every application of a "low" is actually a low driven signal. If certain component circuitry within FIG. 3 is not activated, then any of leads 295-297 and 275-277 can "float." However, in order to turn on an LED disposed between any two signal leads, a high bias signal as between two leads is required to activate that LEDs.

Figure 4:
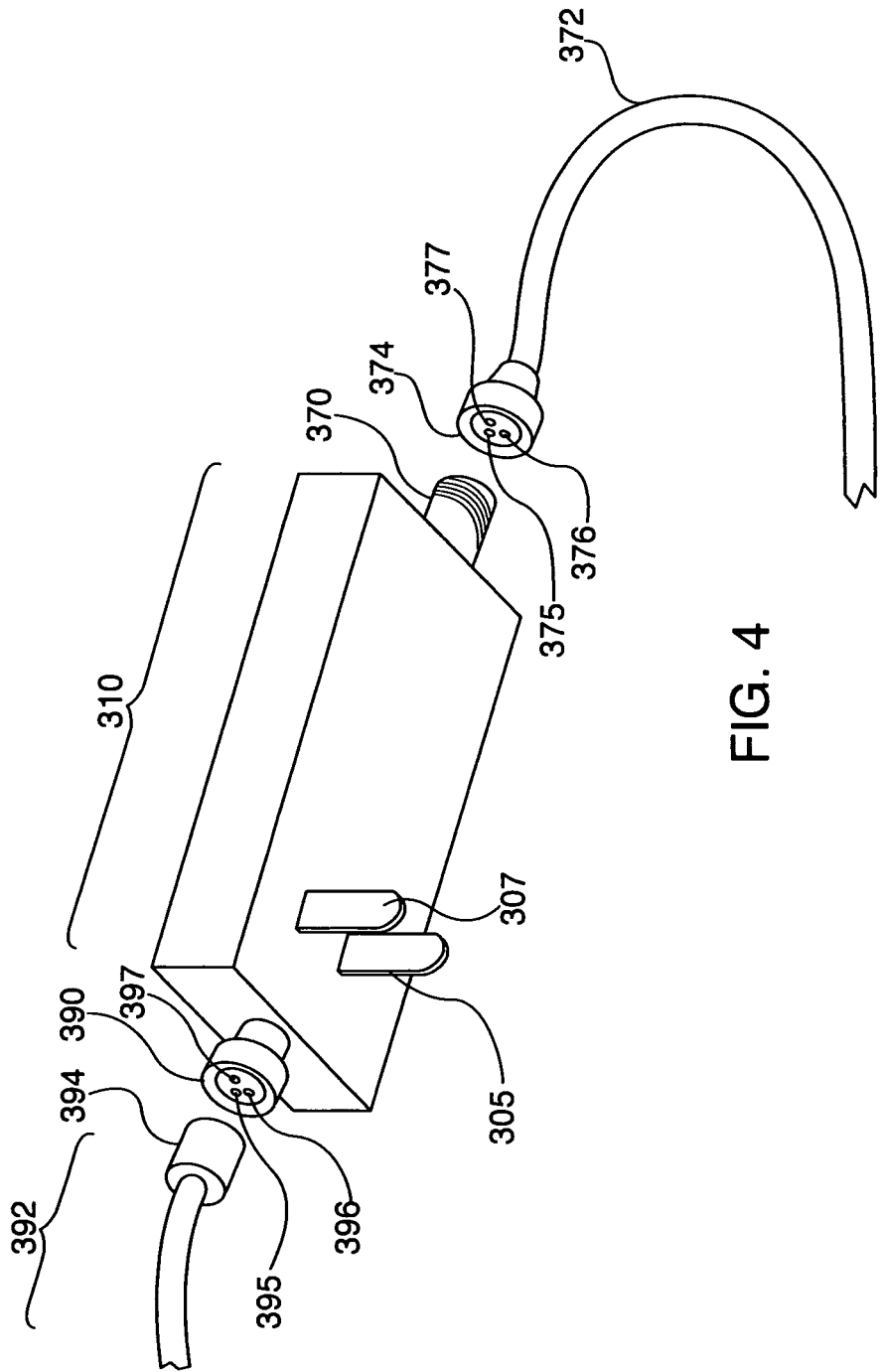
FIG. 4 shows an external view of the light string power module of FIG. 3 according to another embodiment of the present invention.

FIG. 4 shows an external view of the power module 310 including the first and second light strings (uncoupled to the power module). First light string 392 has polarized connector 394 that mateably engages with polarized connector 390 on the power module 310. The three leads 395, 396 and 397 that make electrical connection with the first light string leads (not shown) are shown within connector 390. Blades 305 and 307 are sized according to the appropriate electrical building standards and are provided for plugging into a residential electrical outlet for supplying power to the power module 110. Second light string 372 has polarized connector 374 that mateably engages with polarized connector 370 on the power module 310. The three leads 375, 376 and 377 within the second light string are provided and make electrical connection with the leads within connector 370 (not shown).

Figure 5:
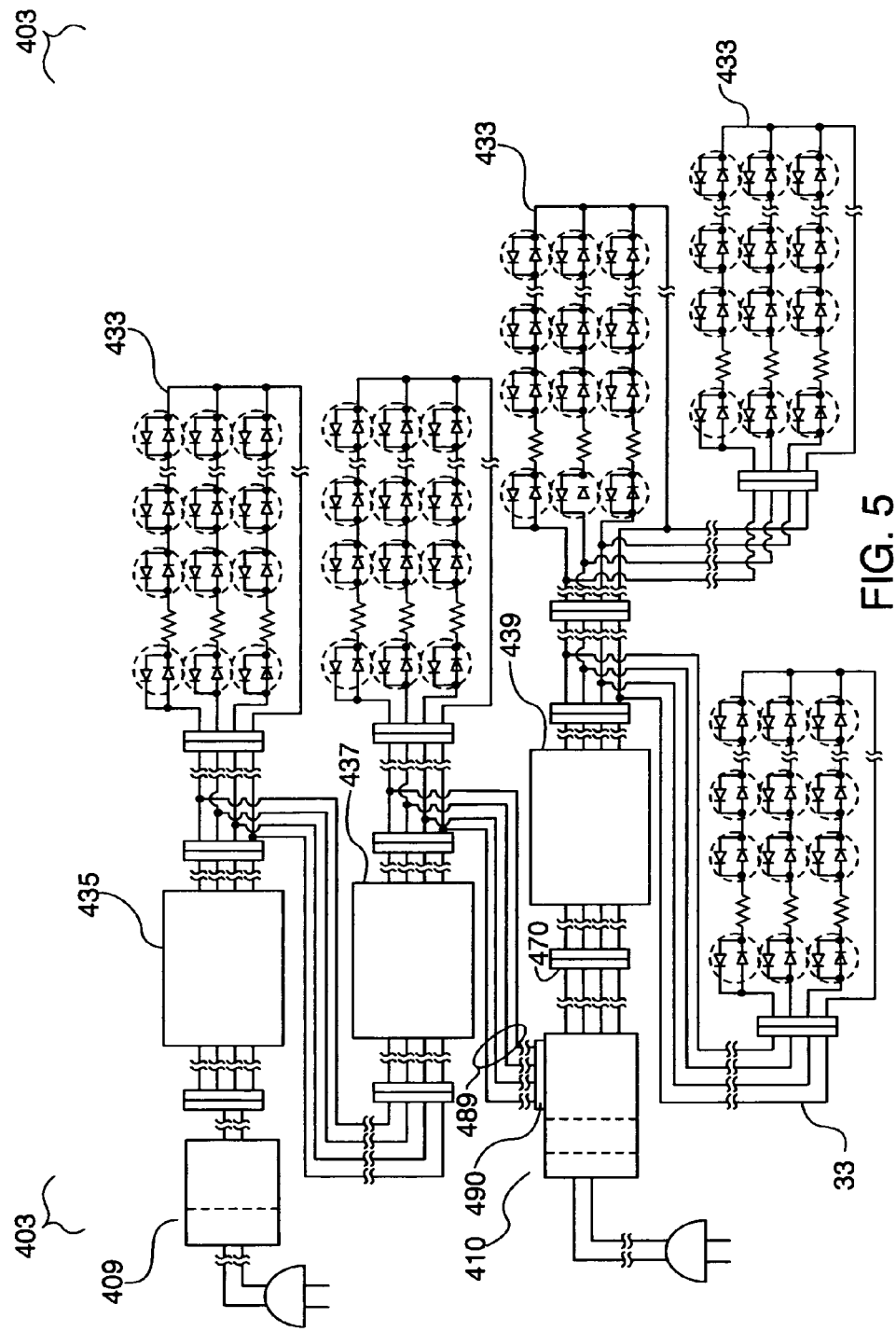
FIGS. 5-7 show three light string systems in which the power module of the present invention may be used in connection with various arrangements of system components.

FIG. 5 shows the application of the present invention as used within a complete lighting system 403. Typical power module 409 and the power module of the present invention 410 are shown as providing power to pattern control switch modules 435 and 439 respectively. The pattern control switching modules perform one of several functions, such as "bypass" (input color pattern signaling being driven to the output color pattern signaling), or active color scheme selection. In the active color scheme selection mode, the pattern control switch module is set to one of a plurality of color patterns through either a mechanical, electrical or electromechanical means such that the coupled output light strings achieve the desired color patterns. So in FIG. 5, pattern control switching module 435 is the lead pattern control switching module which is, in turn, used to drive the color signals to pattern control switching module 437. It should be noted that pattern control switching modules 435 and 437 are powered by typical power module 409 and that repetitive extension of the system through the addition of light strings and pattern control switching modules will quickly consume the power budget of the typical power module 409. Thus, at some point in the system expansion, the "booster" power module 410 of the present invention is added such that the input light color pattern provided at connector 490 provided by bridging leads/wiring 489 is replicated at the output connector 470 all downstream elements of which are powered by the independent power module 410.

It should be noted that the bypass and switching modules described herein may be of the type found in commercial use, or alternatively, those found within applications filed by the applicant of the present invention, such as the All Holidays Lighting System described in U.S. patent application Ser. No. 13/694,754 entitled Apparatus and Method for Controlling LED Light Strings, filed Dec. 31, 2012; the Bypass Switch System described in U.S. patent application Ser. No. 12/930,892 entitled Apparatus and Method for Controlling LED Light Strings, filed Jan. 19, 2011; or the Rotary Switch System described in U.S. patent application Ser. No. 13/986,061 entitled Apparatus and Method for Controlling Multicolored Light Strings, filed Mar. 28, 2013. Any such light pattern selection system may be used as provided in this application.

Figure 6:
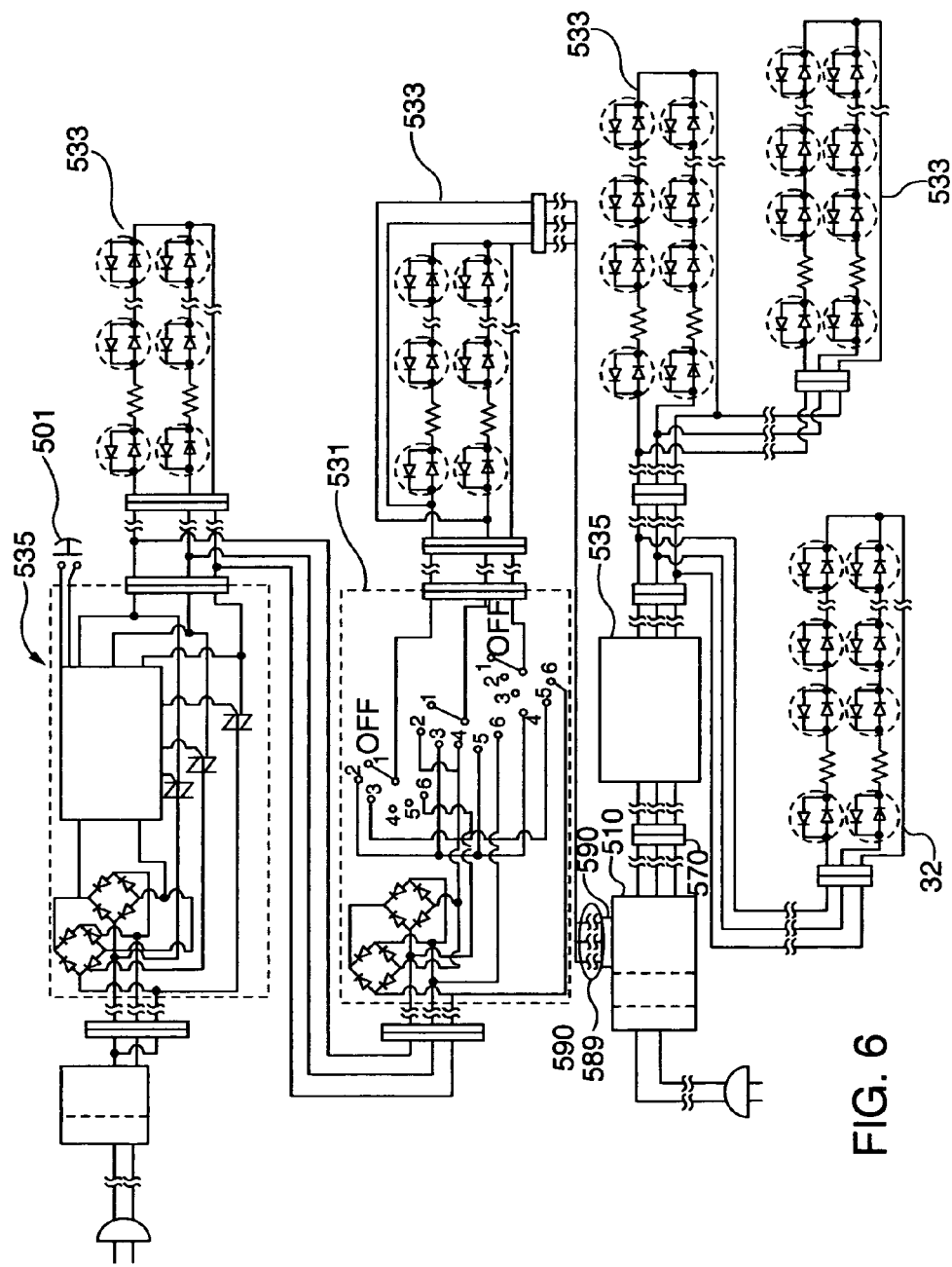

In this regard, FIG. 6 illustrates a more heterogeneous light string system that employs different pattern control switching modules. Electronic pattern control switching module 535 is shown in the top and bottom portions of the system while mechanical pattern control switching module 531 is shown in the middle portion of the system. Bottom portion of the lighting system and associated light strings 533 are shown with booster power module 510 providing the power for those strings. Feeder leads or wiring 589 provides the input color control signaling at connector 590 as replicated by power module 510 at output connector 570. The output, in turn, is provided to yet another pattern control switching module 535 which may, itself have its own bypass/active switching mechanisms for selecting the color patterns to be displayed on the downstream powered light strings. Switch 501 may be provided on any of the pattern control switching modules so as to select between the pass-through/bypass and active color pattern control functions.

Figure 7:
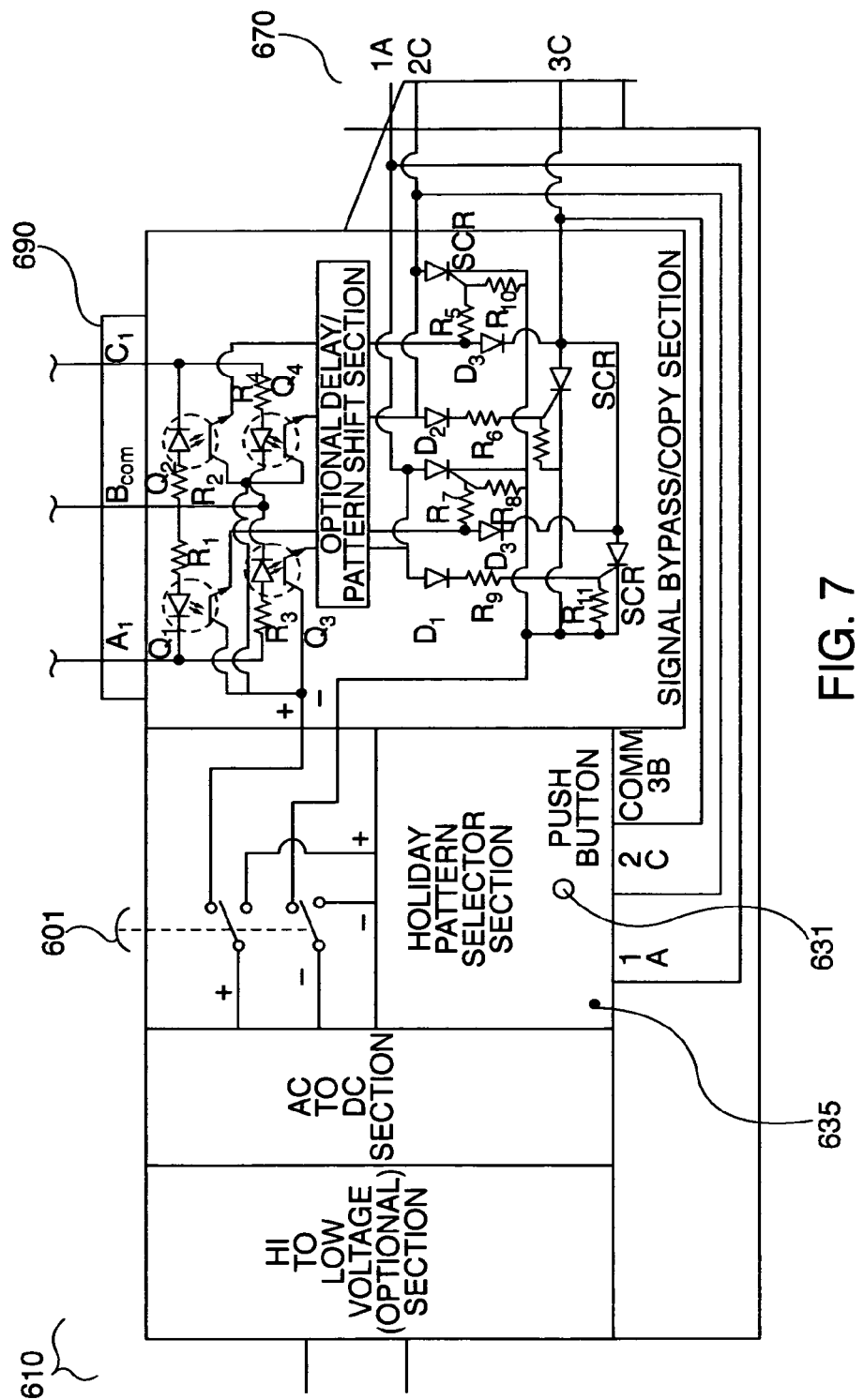

FIG. 7 shows an embodiment of the present invention in which the pattern control switching module 635 is included as part of the power module 610. This particular pattern control switching module selects a color pattern signaling from among any of a number of preprogrammed color patterns by repetitively pushing the pattern selector button 631—each push of the button advancing to the next color pattern in a cyclical fashion. As with FIG. 5, switch 601 may be provided and coupled with the pattern control switching module 635 so as to select the output provided at output connector 670 to be either the pass-through/bypass as provided at the connector 690 or the active color pattern provided by the pattern control switching module 635.

Figure 8:
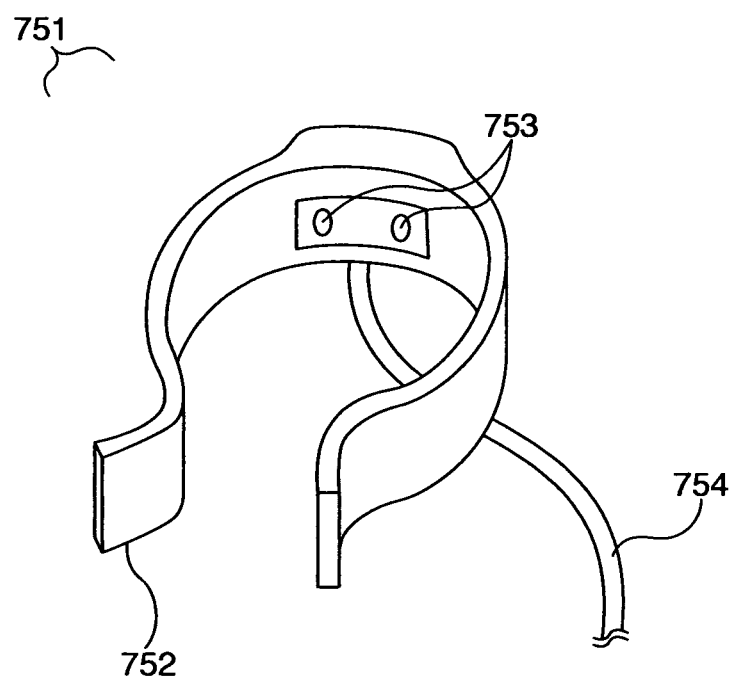
FIG. 8 shows an external view of a light harness according to one aspect of the invention.
Figure 9:
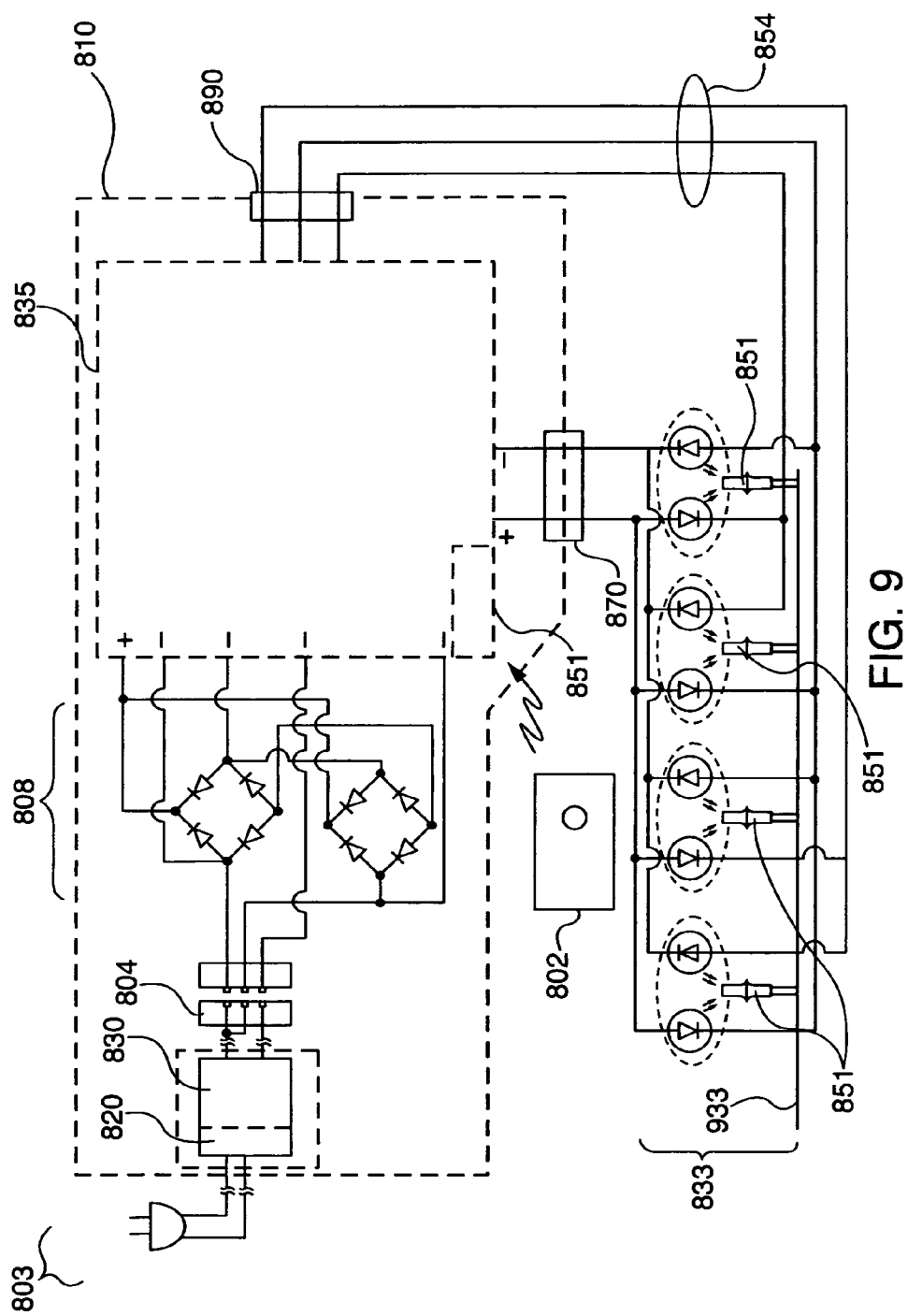
FIG. 9 shows a light string system in which the light harness of FIG. 8 may be included.

In yet another embodiment of the invention, the optical coupling function is removed from the power module as provided in FIGS. 8 & 9. As shown in FIG. 8, a bulb harness 751 is provided and is composed of a clip portion 752 and optical detection or coupling sensors 753 that provide signaling through wiring or lead 754. Clip portion 752 is configured to be clipped onto a bulb of a physically proximate light string to be mimicked. Sensors 753 may be color filter optical sensors that detect either or both of the state of the bulb being on and the color being displayed. Alternatively, the bulb harness may contain wireless transmission capabilities so as to convey the same information to the power module without the need for physical lead or hard wire 754.

FIG. 9 shows an exemplary system in which the harness of FIG. 8 may be used. As shown in the lighting system 803 in FIG. 9, the power module 810 is broken down into a more modular interconnectivity arrangement in which separate high-to-low voltage converter 820 and AC-DC rectification 830 are separated from the pattern control switching module 835 by coupling 804. The coupling 804 is, in turn, coupled to full-wave bridge rectification section 808 and then, in turn, to pattern control switching module 835. Input lighting signaling provided by leads/wiring 854 at connector 890 is replicated by the internal circuitry or programming within pattern control switching module 835 so as to mirror that signaling at connector 870. External wireless control module 802 and internal wireless receiver 851 are optionally provided in connection with pattern control switching module 835 so as to provide wireless control of the pattern control switching module 835 (i.e. selecting bypass or another particular color pattern).

With respect to color signal input, bulb harnesses 851 are provided around the dual color LED bulbs on external light string 933 that is to be emulated. The optical sensors in the harnesses detect the on/off status and/or the color being displayed by the bulbs on light string 833 and pass that sensed information back to the power module 810 at connector 890 via signal leads or wires 854. These signals are then used to trigger SCRs and operate the switching module within the power module of the present invention as provide in the above-written description with respect to FIGS. 1 and 3 so as to provide power to light string 833 at connector 870.

Although various embodiments, which incorporate the teachings of the present invention have been shown and described in detail herein, those skilled in the art can readily devise many other varied embodiments that still incorporate these teachings.

What is claimed is:

1. A light string power module coupled to a first light string and a second light string, said power module comprising:

a power processing module for receiving input AC power and providing output DC power;

a first connector used to provide a connection to said first light string, a second connector used to provide a connection to said second light string, each of said first and second connectors having a plurality of leads, each of said leads of said first connector having a matching lead in said second connector;

a switching module coupled to said power processing module and said first and second connectors, said switching module having a high impedance section for detecting a voltage polarity at said leads of said first connector, a switching section for accepting said detected voltage polarity of said leads of said first connector and providing the same voltage polarity to each of said matching leads of said second connector thereby passing said output DC power provided by said power processing module to said second light string.

2. The light string power module of claim 1 wherein said power processing module includes a high voltage to low voltage converter.

3. The light string power module of claim 1 wherein said input power is AC power and said power processing module includes an AC-to-DC rectifier.

4. The light string power module of claim 1 wherein the coupling between said high impedance input section and said switching section includes an optical coupler.

5. The light string power module of claim 4 wherein an optical coupler is included within a bulb harness disposed external to a housing of said light string power module, said optical coupler coupled to said leads of said first connector.

6. The light string power module of claim 4 wherein said optical coupler is a photo-transistor.

7. The light string power module of claim 1 wherein said first and second connectors are polarized.

8. The light string power module of claim 1 wherein said switching section is comprised of discrete electronic components including resistors and silicon controlled rectifiers.

9. The light string power module of claim 1 wherein said switching module is comprised of an integrated circuit.

10. The light string power module of claim 9 wherein said integrated circuit includes a microprocessor and associated memory, said microprocessor executing a program stored in said associated memory to provide said detected voltage polarity at said leads of said first connector to said matching leads in said second connector.

11. The light string power module of claim 1 further comprising a pattern control switching module for generating an independent light color pattern and a switch for selecting one of said switching module or said pattern control switching module, said voltage polarities presented to said leads of said second connector being provided by said pattern control switching module instead of said switching module when said switch is set to select said pattern control switching module.

12. The light string power module of claim 11 further comprising a wireless controller for controlling said pattern control switching module and said switch.

\* \* \* \* \*